United States Patent Office 2,941,938
Patented June 21, 1960

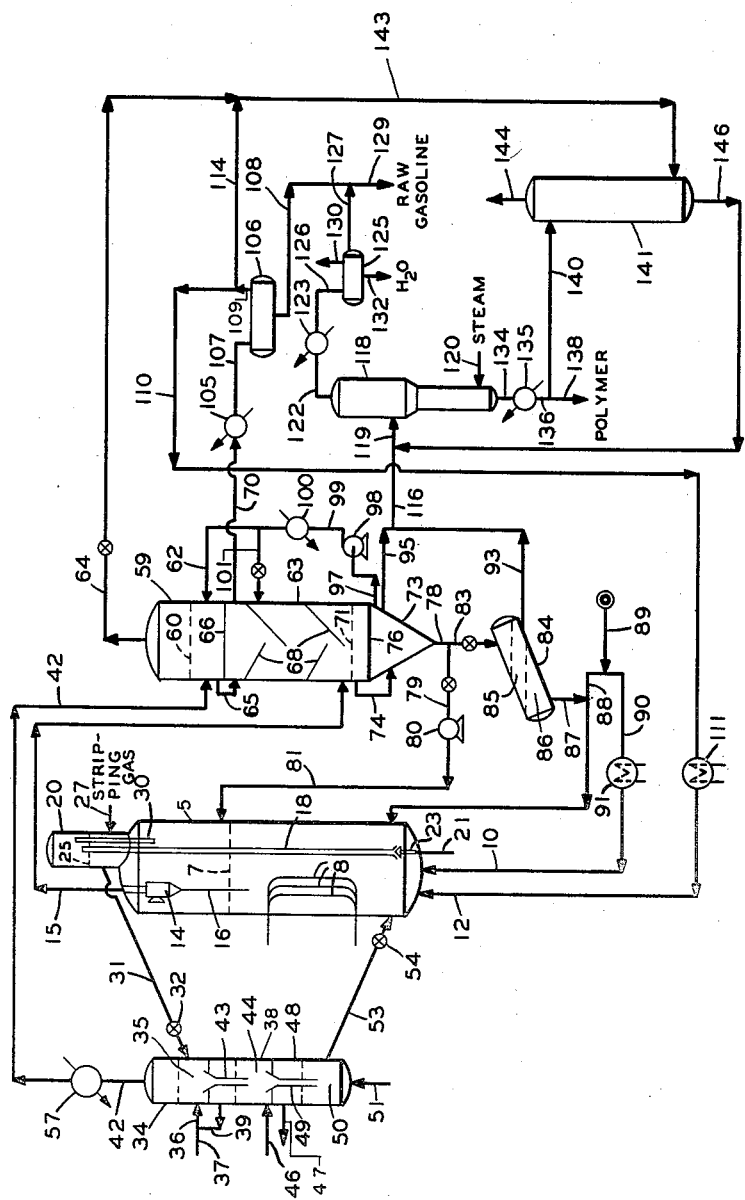
INVENTORS
THEODORE C. VIRGIL
MARVIN F. NATHAN
BY
G. H. Palmer
ATTORNEYS.

2,941,938

HYDROCARBON CONVERSION PROCESS WITH THE RECOVERY OF THE CATALYTIC FINES

Theodore C. Virgil, Basking Ridge, N.J., and Marvin F. Nathan, New York, N.Y., assignors to The M. W. Kellogg Company, a corporation of Delaware Filed June 29, 1954, Ser. No. 439,978

6 Claims. (Cl. 208—140)

This invention relates to an improved fluid system, and more particularly, it pertains to an improved method of reforming a light hydrocarbon oil by means of a fluidized platinum system whereby catalyst losses are reduced substantially over other fluid systems.

In using the fluid technique for a process involving a platinum catalyst, it is important to provide effective means for recovering catalyst fines entrained in the effluent streams, otherwise catalyst losses may be prohibitive due to the high cost of the catalyst. Thus far, consideration has been given to using filters for preventing the escape of catalyst from the processing zones, however, this technique has not proved satisfactory. Various other techniques suggested by prior art workers have been considered, but for various reasons not a single method has proved entirely satisfactory for commercial exploitation. By means of this invention, a method is proposed for overcoming the catalyst loss problem in a fluid platinum system.

It is contemplated by means of this invention to contact a chemical reactant with a fluidized mass of finely divided solid material under suitable treating conditions in a treating zone to produce a vaporous or gaseous product including a high boiling normally liquid product and entrained solid fines, and thus contaminating the solids with a combustible deposit, withdrawing contaminated solids from the treating zone and passing the same to a combustion zone wherein the combustible contaminants are burned by means of an oxygen containing gas to produce a flue gas containing entrained solid fines, condensing at least a portion of high boiling normally liquid product material from the vaporous product, scrubbing solid fines from the vaporous product in a scrubbing zone by means of high boiling normally liquid product condensate thereby forming a slurry of solid fines, separating normally liquid product condensate substantially free of solid fines from the slurry, passing separated condensate to a second scrubbing zone, passing the flue gas containing entrained fines to the second scrubbing zone wherein said fines are removed by scrubbing with the separated condensate to form a slurry, and passing separated condensate to the first scrubbing zone, wherein it is employed to scrub fines from the vaporous product.

More particularly, the present invention is concerned with a fluid reforming system in which the product boiling above the gasoline fraction, commonly referred to as polymer, is employed as the above described high boiling normally liquid product. In the reforming system, it is also contemplated condensing the low boiling normally liquid product or gasoline material and separating the same from the normally gaseous product. All or part of the normally gaseous product is recycled to the reaction zone. In a hydroforming system, only a portion of the gaseous product is usually recycled and the remaining portion may or may not be combined with the scrubbed flue gas. When the net yield of gaseous product is combined with the flue gas, it is passed to an absorption zone wherein the polymer is employed as the absorption medium to recover any gasoline material which is contained in the flue gas and normally gaseous product stream.

Broadly, in a hydrocarbon conversion system, the flue gas which is combined with the normally gaseous product is passed to an absorption zone wherein the high boiling normally liquid product serves as the absorption medium. Further, a portion of the high boiling product condensate which is separated from the slurry is passed to a heating or stripping zone wherein any lower boiling normally liquid product included therewith is removed, and the denuded high boiling condensate is passed to the absorption zone for recovery of normally liquid product material from the flue gas and normally gaseous product material. The enriched high boiling condensate is returned to the heating or stripping zone, wherein the lower boiling normally liquid product material is removed therefrom and the denuded condensate is returned to the absorption zone.

The present invention is applicable to hydrocarbon conversion processes wherein a hydrocarbon reactant is contacted with a fluidized bed of finely divided conversion catalyst under suitable conversion conditions to produce a desired reaction product and thus contaminating the catalyst with combustible deposits or carbonaceous material which is regenerated by combustion with an oxygen containing gas. In general, this process can be used for hydrocracking, hydroforming, dehydrogenation, hydrogenation, isomerization, desulfurization, etc. Hydrocarbon conversion processes can be conducted at a temperature of about 400° to about 1250° F., a pressure of about 1 atmosphere to about 1500 p.s.i.g., a weight space velocity, measured as the pounds of oil charged to the reaction zone per pound of catalyst present therein, in the order of about 0.05 to about 15, and a catalyst to oil ratio, on a weight basis, of about 0.001 to about 12. The conversion catalyst can be any one of the known types for the intended reaction.

Our invention is particularly applicable to a reforming system wherein a light hydrocarbon oil, e.g., gasoline, naphtha or kerosene, is contacted with the fluidized platinum catalyst at a temperature of about 750° to about 1075° F., preferably about 850° to 950° F.; a pressure of about 50 to about 1000 p.s.i.g., preferably about 50 to about 400 p.s.i.g.; a weight space velocity of about 0.1 to about 10, preferably about 0.25 to about 5.0; a catalyst to oil ratio of about 0.1 to about 2.0, preferably about 0.02 to about 1.0; and in the presence of added hydrogen in the amount of about 500 to about 15,000 standard cubic feet of hydrogen (measured at 60° F. and 760 mm.) per barrel of oil feed (1 barrel equals 42 gallons) and abbreviated as s.c.f.b., preferably about 1000 to about 7500 s.c.f.b. In a hydroforming system, the conditions are selected on the basis of providing a net production of hydrogen, and the hydrogen with normally gaseous hydrocarbons is recycled to the reaction zone.

The reforming catalyst containing combustible deposits is regenerated by employing either a mild regenerating treatment involving a regeneration gas having an oxygen partial pressure of about 0.1 to about 3.0 p.s.i.a., a temperature of about 500 to about 1100° F., and for about 0.1 hours or, in the case of a noble metal catalyst, e.g., platinum, a severe treatment wherein a regeneration gas having an oxygen partial pressure of about 5 to about 200 p.s.i.a., a temperature of about 850° to about 1100° F., and for a period of about 0.1 to about 10 hours or a combination of the two treatments, viz., a mild treatment is employed to remove at least a major amount of the combustible deposits and then followed by the severe treatment. Following the regeneration treatment, the noble metal catalyst can be treated with hydrogen containing gas to react with adsorbed oxygen or chemically combined oxygen. The treatment is conducted at a temperature of about 600° to about 1200° F., and for a period of about 0.1 to about 15 hours.

The reforming catalyst of the present invention comprises any suitable hydrogenation-dehydrogenation catalyst e.g., the oxides and/or sulfides of a metal of Group V and/or Group VI or platinum either alone or supported on a carrier material such as, for example, alumina, silica-alumina, zinc spinel, bauxite, activated carbon, alumina-boria, halogenated alumina, magnesia, etc. The catalytic element constitutes about 0.01 to about 20% by weight based on the total catalyst, or in the case of platinum, preferably about 0.1 to about 2.0%, on the same basis.

In order to provide a fuller understanding of this invention, reference will be had to the accompanying drawing which forms a part of this specification.

In the drawing, a vertical, cylindrical reactor 5 contains a dense fluidized bed of finely divided platinum catalyst having a level 7. The catalyst comprises about 0.6% by weight of platinum supported on alumina and has a particle size of about 0 to 80 microns. The hydroforming reaction is highly endothermic, thus heat is supplied to the reaction zone by means of a heating coil 8. Vaporized naphtha having an API° gravity of 51.0 is introduced into the bottom of the reactor by means of line 10 at a temperature of 975° F., and at a rate sufficient to provide a weight space velocity of about 4.0. The average temperature of the catalyst bed is 920° F. and the pressure in the reactor is maintained at about 200 p.s.i.g. Recycle gas containing about 90% by volume of hydrogen is fed to the bottom of the reactor 5 via line 12 at a temperature of 1000° F. and at a rate of 2500 s.c.f.b. A vaporous reaction product leaves the reactor catalyst bed containing entrained catalyst fines. A substantial portion of the entrained catalyst is recovered by means of cyclone 14, thus the reaction product leaving through product line 15 contains about 2 to 100 grains of fines per cubic foot of vaporous reaction product. The separated catalyst is returned to the catalyst bed via dipleg 16. The catalyst in the reactor is withdrawn continuously and it has a carbon content of about 1.0° by weight. The spent catalyst is transported upwardly in riser 18 which extends from the bottom of the reactor to a stripping zone 20 superimposed on the reactor. The catalyst is passed through riser 18 by means of hydrogen containing gas which is fed from line 21 to a hollow plug valve 23 which is located at the lower open end of the riser.

The spent catalyst is discharged from riser 18 into the stripper 20 and it forms a dense fluid bed having a level 25 therein. Stripping gas such as, for example, hydrogen containing gas or recycle gas, flue gas, nitrogen, etc., is fed to the bottom of the stripper via line 27. The volatile combustible material is stripped from the catalyst and combined with the stripping gas, after which it passes to the top of the reactor 5 by means of a conduit 30 which interconnects the two zones. The stripped catalyst is withdrawn from the stripper by means of a transfer line 31 which contains a slide valve 32 for automatic rate control.

The stripped catalyst passes from transfer line 31 to a first regenerator 34 wherein there is maintained a dense fluidized bed 35 of catalyst. The carbonaceous deposit on the catalyst is partially or completely removed by means of oxygen containing gas, e.g., air or diluted air, which is introduced to the regenerator via line 36. A fresh supply of oxygen containing gas can be fed to the regenerator 34 by means of line 37 and/or effluent gas containing oxygen from a second regenerator or rejuvenator 38 is supplied via line 39 to regenerator 34. The temperature of regeneration in regenerator 34 is maintained at a temperature of about 1050° F., however, this can be varied over the range of about 550° to about 1100° F. In this phase of regeneration, the conditions are preferably maintained to provide a mild condition of treatment. The oxygen concentration in the regeneration gas under regeneration conditions provides a partial pressure of about 0.10 to about 15 p.s.i.a. or higher, however, where high oxygen partial pressures are used, temperature and residence time of catalyst should be preferably low and short, respectively, in order to maintain a mild condition. The flue gas produced from burning carbonaceous material in regenerator 34 is discharged overhead by means of line 42. The flue gas preferably contains no oxygen, however, a small amount, in the order of about 0.005 to 0.5% by volume, may be tolerated. In the event that the oxygen content of the flue gas is higher than desirable, it can be consumed by injecting a combustible material, e.g., a combustible gas such as recycle gas, into regenerator 34 or line 42. The flue gas contains about 2 to 100 grams of catalyst fines per cubic foot of gas.

Regenerated catalyst is passed from regenerator 34 to rejuvenator 38 via standpipe 43. A dense fluidized bed 44 of catalyst is maintained in rejuvenator 38. In this zone, the temperature is, for example, 1000° F., however, it can be varied from about 850° to 1150° F. The conditions of treatment in the rejuvenator are maintained severe by employing a rejuvenation gas in a quantity to provide an oxygen partial pressure of about 5 to about 400 p.s.i.a. in conjunction with catalyst residence time and temperature favorable for this purpose. The rejuvenation gas is supplied by means of line 46. In this example, the oxygen partial pressure in the rejuvenator is 43 p.s.i.a.

The rejuvenated catalyst is discharged from the rejuvenator 38 to a reducer 48 via a standpipe 49. A fluidized dense bed 50 of catalyst is present therein and it is contacted with a hydrogen containing gas, e.g., recycle gas, from the hydroforming reaction which is fed from line 51 to the bottom of the reducer. The reducer is maintained at a temperature of 1000° F., and under a pressure of about 200 p.s.i.a. The temperature can be varied from about 700° to about 1050° F. The reduced catalyst is returned to the reactor 5 by means of transfer line 53 which contains a slide valve 54 for automatic control of the catalyst flow. The effluent from reducer 48 is discharged by means of line 47, and this material can be passed to the reactor, although not shown.

Although not shown, the flue gas leaving regenerator 34 may be passed through a separating means, e.g., a cyclone, for the removal of catalyst fines therefrom or this flue gas can pass through the regenerator 34 at a superficial linear gas velocity of about 0.1 to about 1.0 foot per second and leave the regeneration zone without preliminary separation of catalyst fines therefrom. The flue gas is passed through a cooler 57 whereby the temperature is reduced to about 360° F., and thence it flows into the bottom part of a first scrubber 59. In scrubber 59, liquid polymer having a level 60 is maintained such that the flue gas bubbles through and entrained catalyst fines are substantially all removed therefrom. The temperature of the liquid polymer in this scrubber is maintained at about 80° to 250° F., and the flue gas passes through the scrubbing zone at a superficial linear gas velocity of about 0.05 to about 1.0 foot per second. The total pressure is maintained at essentially the same pressure as the regenerator 34. Liquid polymer substantially free of solids is fed to the scrubber 59 via line 62. The rate of polymer fed to the scrubber will depend on the volume of flue gas. However, the relative rate of polymer to flue gas can be very high, because it may be desirable to pass the entire polymer charge to be used for scrubbing in a second scrubber 63 as well as in scrubber 59 through the latter scrubber first. In general, about 10 to about 5000 cubic feet of flue gas, 60° F. and 760 mm., are passed through scrubber 59 per barrel of polymer charged thereto, preferably about 50 to about 3000 standard cubic feet per barrel of polymer. The flue gas substantially free of catalyst is discharged from the scrubber 59 via an overhead line 64. The polymer laden with catalyst fines is passed from the bottom of the scrubber via line 65, and thence it flows into the top part of the scrubber 63. Scrubber 59 and scrubber 63 are separated by a partition 66.

Scrubber 63 contains slanting baffles 68 over which the downflowing polymer passes for even distribution over the cross-sectional area of the scrubber. The vaporous reaction product containing entrained catalyst fines in line 15 passes to the bottom of scruber 63. This product stream may be cooled to a temperature of about 500° to about 750° F. prior to entering the scrubber 63, or it can enter at essentially the same temperature as in the reactor 5. The polymer which cascades over baffles 68 serves the two-fold purpose of scrubbing catalyst fines from the reaction product and condensing substantially all of the vaporous polymer product therefrom. There is little or no fractionation in this section, however, if desired, fractionating trays can be installed for this purpose. This temperature at the top of scrubber 63 is controlled at a level to permit the gasoline material and lighter product material to pass overhead. In this case, the temperature is 300° F., however, it can vary over a range depending on the relative quantities of heavier product and gasoline. The gasoline and lighter product material pass from the scrubber 63 via an overhead line 70. The condensed polymer and that used to scrub the vaporous reaction product collects in the bottom of the scrubber 63 having a level 71. This polymer contains catalyst fines and in order to effect a separation, the slurry is passed to a settler 73 by means of line 74. Settler 73 is a conically shaped vessel, wherein a supernatant liquid substantially reduced in catalyst concentration is formed in the upper part thereof. The scrubber 63 is separated from settler 73 by means of a partition 76. In the lower part of the settler 73, a slurry of fines is formed. This slurry is discharged from the bottom of the settler 73 via line 78. In one aspect of this invention, the slurry is recycled directly to the reactor by means of valved line 79, pump 80 and line 81. The slurry is recycled to the reactor to a point above the dense bed in the reactor in order to avoid further contact of the polymer with the catalyst. However, in another aspect, the recovered catalyst fines are recycled to the reactor without polymer. In this alternative, the slurry is passed from line 78 to a valved line 83 and thence to a second settler 84. The slurry is permitted to settle further, such that an upper liquid polymer layer 85 substantially free of fines is formed and a lower dense slurry layer 86 is produced. The dense slurry is discharged from the settler 84 by means of line 87 and then it joins with fresh feed in line 88 which serves as a vehicle in which it is transported to the bottom part of the reactor 5. Fresh feed is supplied from line 89, part of which passes to line 88; whereas the major part of the feed passes to line 90. The feed in line 90 passes to a heater 91 wherein it is heated to the desired temperature and thence, it flows through line 10 from which it enters the bottom of reactor 5.

Supernatant polymer is descharged from settler 84 by means of line 93 and combined with supernatant polymer from settler 73 in line 95. Another stream of supernatant polymer is withdrawn from settler 73 via line 97. This stream is transported by means of pump 98, through line 99, cooler 100 and thence to line 62 which is connected to the bottom of scrubber 59. The polymer is cooled to a temperature of about 80° to 250° F. The entire charge of polymer may pass through line 62 or this stream is divided such that about 3 to 97% of the entire stream is passed through valved line 101 to the top of scrubber 63 and the remaining portion passes to scrubber 59. In this case, the scrubbing polymer relative to vaporous reaction product in scrubber 63 is about 1500 to about 3500 standard cubic feet of reaction product per barrel charged thereto.

The vaporous overhead product from scrubber 63 passes through line 70 before entering condenser 105 wherein substantially all of the normally liquid product material is condensed. The cooled product material passes to an accumulator 106 via line 107. The liquid product is discharged from the bottom of accumulator 106 by means of line 108. The normally gaseous product material is discharged from the accumulator through line 109. A portion of this gaseous material rich in hydrogen is recycled to the reaction zone by passing through line 110, reheated in heater 111 and entering the bottom of the reactor via line 12. The recycle of hydrogen is effected by means of a compressor (not shown). The remaining portion of the normally gaseous product material, representing the net production of gaseous product, is passed through line 114 and it combines with the flue gas in line 64.

The polymer material in lines 93 and 95 join as a single stream in line 116. This polymer contains valuable gasoline material which is recovered before discharging the polymer from the system. The polymer enters a stripper 118 via line 119. Steam is fed into the bottom part of the stripper 118 by means of line 120. The steam in conjunction with heat serves to strip the polymer and the gasoline and steam are discharged from the top of stripper 118 through line 122. The gasoline and steam are condensed in condenser 123 and thence enter accumulator 125 via line 126. The gasoline is withdrawn from the accumulator through line 127 and is combined with raw gasoline in line 108 before being discharged from the system via line 129. Fixed gases are withdrawn from the accumulator by means of line 130; whereas the water is charged from the bottom of accumulator 125 via line 132. The stripper is maintained at a top temperature of about 310° F. and a pressure of about 2 p.s.i.g. The temperature at the bottom of the stripper is about 445° F. The stripped polymer is withdrawn from the bottom of the stripper via line 134 and then it is cooled to a temperature of 100° F. by means of cooler 135. The cooled polymer passes through line 136 before dividing such that the net production of polymer from the hydroforming reaction is yielded through line 138, and the major portion of the cooled polymer passes through line 140 to the top of an absorber 141. The cooled polymer is passed to the absorber by means of a pump (not shown). The combined streams of scrubbed flue gas and normally gaseous product in line 143 enter the bottom of absorber 141. The flue gas contains valuable gasoline material by reason of contacting raw polymer in scrubber 59 and also the gaseous product material by reason of the crude separation from normally liquid products. The absorber is at a temperature of about 110° F. and a pressure of 190 p.s.i.g. The denuded gaseous material is discharged overhead via line 144; whereas the enriched polymer is discharged from the absorber through bottom 146, and thence it is recycled to the stripper 118 by joining with raw polymer in line 119 which leads to the stripper. The absorption of normally liquid product material from the gases being fed thereto can be effected, in the alternative, by first contacting the gases with fresh feed and then contacting the gases with polymer.

Having thus provided a description of our invention including specific examples, it should be understood that no undue limitations or restrictions are to be imposed by reason thereof, but that the invention is defined by the appended claims.

We claim:

1. A process which comprises contacting a light hydrocarbon oil with a fluidized mass of finely divided supported platinum catalyst under treating conditions in a treating zone thereby producing a gasiform product including a high boiling normally liquid product, a lower boiling normally liquid product and entrained catalyst fines and contaminating the catalyst with a combustible material, withdrawing contaminated catalyst from the treating zone and passing the same to a burning zone wherein the combustible material is burned by means of an oxygen containing gas to produce flue gas containing entrained catalyst fines, condensing at least a portion of the high boiling liquid product from the gasiform product, scrubbing fines from the gasiform product with the high boiling liquid condensate, scrubbing fines from the flue gas with the high boiling liquid condensate, combining the fines laden condensates by passing condensate from the flue gas scrubbing step to the gasiform product scrubbing step, separating a slurry of fines from the combined condensates thus leaving a high boiling liquid condensate substantially free of fines, recycling the slurry of fines to the treating zone, and heating the liquid condensate free of fines to remove therefrom any lower boiling liquid product material.

2. A process which comprises contacting a light hydrocarbon oil with a fluidized mass of finely divided platinum catalyst under treating conditions in a treating zone thereby producing a gasiform product including a high boiling normally liquid product, a lower boiling normally liquid product, a normally gaseous product and entrained catalyst fines and contaminating the catalyst with a combustible material, withdrawing contaminated catalyst from the treating zone and passing the same to a burning zone wherein the combustible material is burned by means of an oxygen containing gas to produce flue gas containing entrained catalyst fines, condensing at least a portion of the high boiling normally liquid product from the gasiform product, scrubbing fines from the gasiform product with the high boiling liquid condensate, scrubbing fines from the flue gas with the high boiling liquid condensate, combining the fines laden condensates, separating a slurry of fines from the combined condensates and thereby leaving a high boiling liquid condensate substantially free of fines, recycling the slurry of fines to the treating zone, heating the high boiling liquid condensate substantially free of fines to remove therefrom any lower boiling normally liquid product, separating the lower boiling normally liquid product from the normally gaseous product, combining the flue gas with the normally gaseous product, passing the combined flue gas and normally gaseous product to an absorption zone wherein the high boiling liquid condensate substantially free of fines and lower boiling normally liquid product is contacted therewith for the recovery of lower boiling normally liquid product contained therein.

3. A process which comprises contacting a light hydrocarbon oil with a fluidized mass of finely divided supported platinum catalyst under treating conditions in a treating zone thereby producing a gasiform product including a normally liquid product and entrained catalyst fines and contaminating the solids with a combustible material, withdrawing contaminated catalyst from the treating zone and passing the same to a burning zone wherein the combustible material is burned by means of an oxygen containing gas to produce flue gas containing entrained catalyst fines, condensing at least a portion of the normally liquid product from the gasiform product, passing the flue gas to a first scrubbing zone wherein it is contacted with liquid condensate for the removal of fines therefrom, passing the liquid condensate from the first scrubbing zone to a second scrubbing zone wherein it is contacted with the gasiform product for the removal of fines therefrom, separating a slurry of fines from the liquid condensate and thereby leaving a condensate substantially free of fines, passing at least a portion of the liquid condensate substantially free of fines to the first scrubbing zone, and recycling the slurry of fines to the treating zone.

4. A hydroforming process which comprises contacting a naphtha fraction with a fluidized mass of finely divided platinum reforming catalyst under suitable reforming conditions in a reaction zone thereby producing a reaction product containing polymer, gasoline, normally gaseous material and entrained catalyst fines and contaminating the solids with a carbonaceous material, withdrawing contaminated catalyst from the reaction zone and passing the same to a regeneration zone wherein the carbonaceous material is burned by means of an oxygen containing gas to produce flue gas containing entrained catalyst fines, condensing at least a portion of the polymer from the reaction product, scrubbing catalyst fines from the flue gas with condensed polymer in a first scrubbing zone, passing the condensed polymer from the first scrubbing zone to a second scrubbing zone wherein it serves to scrub catalyst fines from the reaction product, separating a slurry of catalyst fines in polymer and thereby leaving polymer having the fines substantially removed therefrom, passing a portion of the separated polymer to the first scrubbing zone, recycling the slurry of fines to the reaction zone, passing another portion of the separated polymer to a heating zone wherein gasoline is removed therefrom, separating the gasoline from the normally gaseous product, combining the scrubbed flue gas with the normally gaseous product, passing the combined flue gas and normally gaseous product to an absorption zone wherein polymer serves to remove any gasoline contained therein, passing the enriched polymer from the absorption zone to the heating zone, passing the denuded polymer from the heating zone to the absorption zone, and yielding from the heating zone polymer substantially free of fines and gasoline as a product of the process.

5. The process of claim 4 wherein the platinum catalyst is supported on alumina.

6. A process which comprises contacting a light hydrocarbon oil with a fluidized mass of finely divided catalyst under treating conditions in a treating zone thereby producing a gasiform product including a normally liquid product and entrained catalyst fines and contaminating the solids with a combustible material, withdrawing contaminated catalyst from the treating zone and passing the same to a burning zone wherein the combustible material is burned by means of an oxygen containing gas to produce flue gas containing entrained catalyst fines, condensing at least a portion of the normally liquid product from the gasiform product, passing the flue gas to a first scrubbing zone wherein it is contacted with liquid condensate for the removal of fines therefrom, passing the liquid condensate from the first scrubbing zone to a second scrubbing zone wherein it is contacted with the gasiform product for the removal of fines therefrom, separating a slurry of fines from the liquid condensate and thereby leaving a condensate substantially free of fines, and recycling the slurry to the treating zone.

References Cited in the file of this patent

UNITED STATES PATENTS

| | | |
|---|---|---|
| 2,449,095 | Wheeler et al. | Sept. 14, 1948 |
| 2,663,676 | Cardwell et al. | Dec. 22, 1953 |
| 2,665,239 | Howard et al. | Jan. 5, 1954 |
| 2,797,189 | Virgil | June 25, 1957 |

UNITED STATES PATENT OFFICE

CERTIFICATE OF CORRECTION

Patent No. 2,941,938                                June 21, 1960

Theodore C. Virgil et al.

It is hereby certified that error appears in the printed specification of the above numbered patent requiring correction and that the said Letters Patent should read as corrected below.

Column 2, line 46, for "0.1" read -- 0.01 --; line 61, for "0.1 hours" read -- 0.1 to about 10 hours --; column 5, line 21, for "This" read -- The --; line 61, for "descharged" read -- discharged --; column 7, lines 12 and 13, for "scrubing" read -- scrubbing --.

Signed and sealed this 20th day of December 1960.

(SEAL)
Attest:

KARL H. AXLINE                                       ROBERT C. WATSON
Attesting Officer                                  Commissioner of Patents